United States Patent
Smith

[15] 3,683,603
[45] Aug. 15, 1972

[54] DEVICE FOR TOPPING TOBACCO PLANTS
[72] Inventor: Elwood Lee Smith, Elm City, N.C.
[73] Assignee: The Lely Corporation, Wilson, N.C.
[22] Filed: June 15, 1970
[21] Appl. No.: 46,384

[52] U.S. Cl. .................................................56/63
[51] Int. Cl. ........................A01d 45/02, A01d 45/16
[58] Field of Search..........56/56, 57, 58, 59, 63, 14.3

[56] References Cited
UNITED STATES PATENTS

| | | |
|---|---|---|
| 2,720,740 | 10/1955 | Price ..........................56/13.6 |
| 2,791,081 | 5/1957 | Allen et al. ..................56/15.7 |
| 2,977,741 | 4/1961 | Stroman ......................56/13.6 |
| 3,144,743 | 8/1964 | Gaunt et al. .................56/14.3 |
| 3,482,379 | 12/1969 | Splinter et al. ................56/63 |

Primary Examiner—Russell R. Kinsey
Attorney—Mason, Mason & Albright

[57] ABSTRACT

A plant topping device for connection to a tractor with a frame and one or more topping mechanisms, including a rotary cutter, being mounted on the frame. An endless feeder is mounted on pulleys adjacent the cutter to move tops towards the cutter to be cut. The endless member can be adjustably positioned relative to the cutter.

12 Claims, 3 Drawing Figures

Patented Aug. 15, 1972

INVENTOR
ELWOOD LEE SMITH
BY
Mason, Mason & Albright
Attorneys

DEVICE FOR TOPPING TOBACCO PLANTS

With the devices of the kind set forth it sometimes is desirable that the way in which the tops to be cut are guided towards the cutter can be changed so that the cutting can take place in a better way.

According to the invention this can be achieved by means of a construction whereby the active portion of the endless feeder is adjustably mounted so that it can be brought in a number of positions with respect to the direction of movement of the device.

For a better understanding of the invention and to show how the same may be carried into effect, reference is made by way of example to the accompanying drawings.

Figure 1:
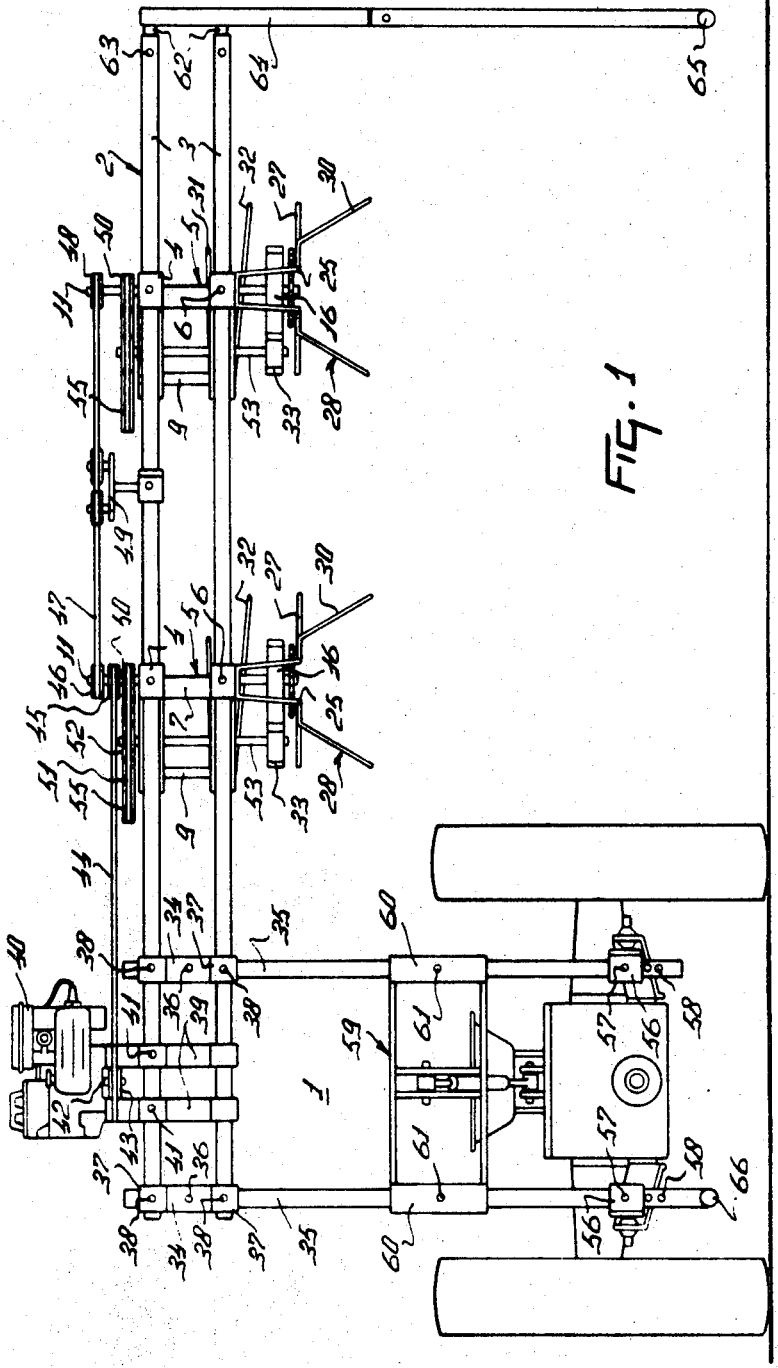
FIG. 1 is a rear view of a device in accordance with the invention attached to the lifting device of a tractor.

The construction shown in the Figures is that of a machine for topping tobacco plants, comprising a frame 1 having a frame portion 2 extending transversely of the direction of movement of the device, said portion having two identical parallel frame beams 3 lying one above the other and each having a square cross-section. Two supports 5 are arranged at a distance from each other on the frame beams 3 by means of sleeves 4. Each of the sleeves 4 is slidable along a frame beam 3 and can be fixed in place by means of a bolt 6. Each support 5 comprises a vertical supporting member 7 to which are connected two triangular support members 8, lying one above the other and extending substantially horizontally. The base of each triangular support is connected to the sleeve 4 of support 7. The ends of the triangular supports 8 remote from the supporting member 7 are connected by means of a substantially vertically extending pipe 9. Each of the supports 8 is provided with a bearing 10 for a vertical shaft 11, the lower end of the shaft 11 being provided with a cutter 12 formed by a disc having a serrated periphery. Near the end of the supports 8 remote from the support 7, each support is provided with a bearing 13 for a vertical shaft 14. The lower end of the shaft 14 carries a roller 15, about which an endless feeder 16 formed by a belt is passed. The belt is furthermore passed about a roller 17 which is located behind the cutter 10, viewed in the direction of movement of the device. The roller 17 is adapted to rotate about a vertical shaft 18 which is carried in a slot 19 provided in a plate 20. The slot 19 extends concentrically with respect to the axis of rotation of the roller 15. The upper end of the shaft 18 by means of a nut 21 can be fixed in a number of positions in the slot 19. The plate 20 is carried by a support 22 which is adjustably connected to a side of the lowermost support 8. The support 22 is connected to the support 8 by means of bolts 23, each of which is movable in a slot 24 for adjustment of the support 22 in a forward or rearward direction. By means of this adjustment the tension of the belt forming the endless feeder 16 can be corrected after an adjustment of the shaft 18 in the slot 19, in order to bring the active portion of the endless feeder in a number of positions with respect to the direction of movement of the device. The rollers 15 and 17 which are adapted to rotate about vertical shafts are arranged so that the portion of the feeder 16 engaging the tops of the tobacco plants to be cut, that is to say the active portion of the feeder, is inclined to the direction of movement of the device. A bracket 25 is arranged on the lowermost sleeve 4 and is provided with forwardly projecting, parallel horizontal rods 26, each of which on its front side is provided with a guide member 27 disposed adjacent the level of the foremost roller 15 of the feeder 16. The guide members 27 (see FIG. 2) are arranged in V-shaped fashion. Each of the rods 26 has attached thereto a laterally extending plate 28 having a horizontal mounting portion 29 and a further portion 30 extending outwardly and downwardly at an oblique angle from said horizontal portion. The two plates 28 form a screen for guiding the tops of the tobacco plants cut by the cutter 12 towards the ground and for screening the upper leaves. The foremost end of the lower support 8 is provided with rearwardly inclined spring steel tines 31, 32 lying one above the other. The lower tine 32 is longer than the upper tine. The tines 31 and 32 are arranged so that they extend in front of and at least substantially parallel to the active portion of the endless feeder 16, whilst they are located above said feeder. The endless feeder 16 which is formed as stated above by a belt is provided with cleats 33 at right angles to said belt at regular intervals. The cleats are preferably made of rubber. At one end the frame portion 2 is supported for vertical displacement by means of sleeves 34 and associated with a frame portion which is to be attached to the lift of a tractor and which comprises two vertical frame beams 35 which are of the same structure as the frame beams 3 of the frame portion 2. The sleeves 34 can be fixed in place by means of clamping bolts 36. The sleeves 34 are each provided with guides 37 in which the beams 3 of the frame portion 2 can be fixed in various places by means of clamping bolts 38. The device can thus be reduced in width for transport purposes.

The two frame beams 3 of the frame portion 2 are provided between the vertical frame beams 35 with supports 39 on which an engine 40 is arranged for driving the various movable parts of the topping mechanisms. The supports 39 are secured in place by means of clamping bolts 41. For the driving purpose a vertical shaft 42 on the lower side of the engine is provided with a pulley 43 which is linked by a belt 44 to a pulley 45 adjacent the top of the vertical shaft 11 which supports the cutter 12 in the topping mechanism nearest the engine 40. A second pulley 46 on the shaft 11 above the first-mentioned is linked by a belt 47 to a pulley 48 on the shaft 11 of the topping mechanism remote from the driving engine 40.

A tension member 49 with spaced apart pulleys is provided in association with the belt extending between the two topping mechanisms. When adapting the positions of the respective topping mechanisms to the spacings between the rows of plants, the stress in the belt of the driving member between the two mechanisms can be restored by rotating and/or sliding the belt tension member 49 on beam 3. The shaft 11 of each of the topping mechanisms carries a further pulley 50 about which an endless belt 51 is passed. The belt 51 is passed about a pulley 52 on a vertical shaft 53 supported by means of a support 54 connected to the uppermost support 8. The belt 51 is also passed about a pulley 55 secured to the upper end of the shaft 14 carrying the foremost roller 15 for the endless feeder 16.

In the construction described above, the two topping mechanisms together with the driving engine can be displaced laterally along the frame beams 3 of the frame portion 2. In practice, however, it will be sufficient to displace the topping mechanism nearest the engine for matching the interval between the rows. The beams 35 of the frame portion which can be coupled to the three-point lifting device of a tractor are provided below with vertically adjustable sleeves 56 to be coupled with the lower arms of the lift of the tractor. For the displacement of the sleeves 56 a bolt 57 is provided which can be passed through a hole in the sleeve and through one of a plurality of holes 58 provided one above the other in each of the beams 35. Between the beams 35 is arranged a coupling member 59 for connection with the upper arm of the tractor lift. The coupling member is adjustably arranged between the frame beams 35 by means of sleeves 60 and clamping bolts 61. At the ends remote from the frame portion which can be coupled with a tractor, in each of the frame beams 3 of the frame portion 2 a pipe 62 is inserted which can be fixed by means of a bolt 63. The pipes 62 are connected to a vertically extending support 64 provided on its lower end with a horizontal support 65 which extends in the direction of travel of the device. The latter support is adjustable in a vertical direction along with frame 2 relative to frame 1. One of the beams 35 of the frame portion which can be coupled with the tractor is extended somewhat and carries on its lowermost end a horizontal support 66 which also extends in the direction of travel of the device. By means of the supports 65 and 66 the device, after disconnection of the tractor, can be supported on the ground.

Figure 2:
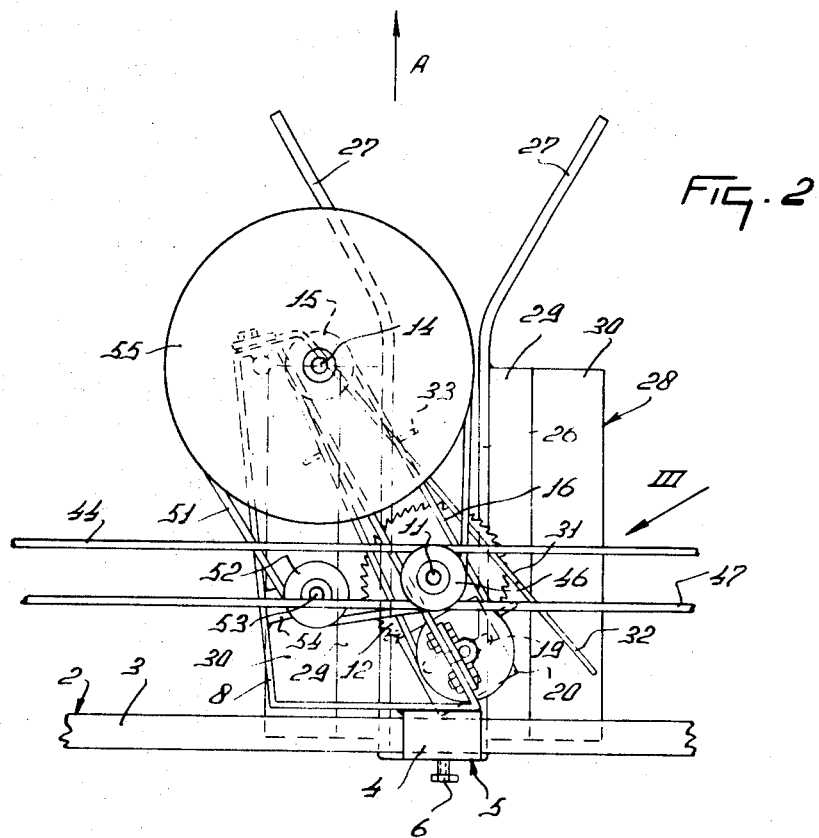
FIG. 2 is a plan view in the direction of the arrow II of a topping mechanism of the device.
Figure 3:
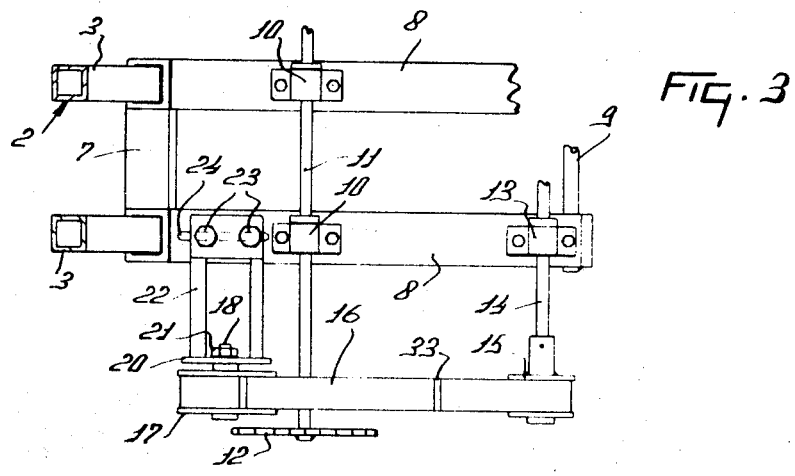
FIG. 3 is a view in the direction of the arrow III in FIG. 2.

The construction described above operates as follows: In operation the device which, as stated above, can be attached by means of the frame portion with the vertical frame beams 35 to the lift of a tractor is moved in the direction of the arrow A (FIG. 2). The topping mechanisms are displaced relatively to each other along the frame beams 3 of the transverse frame portion 2 to an extent such that they match the distance between the rows of tobacco plants where the small-sized tractor is riding. By means of the vertical adjustment of the transverse frame portion 2 the height of the topping mechanisms can be adjusted so that the tops located above the upper leaves can be removed by means of the cutter 12. During the movement the tops are guided between the guide members 27 arranged in V-shaped fashion, viewed in the direction of movement, until they get into the range of the cleats 33 of the endless feeder 16. By means of the cleats 33 on the active portion of the feeder which is inclined to the direction of movement of the device, the tops to be cut are guided towards the rotating serrated disc-shaped cutter 12 until they are cut thereby. The cut tops are thrown also by means of the resiliently arranged tines 31 and 32 located above the feeder 16 onto the screen formed by the plate 28 which guides them towards the ground. An effective guidance of the tops to be cut can be achieved by the fact that the active portion of the endless feeder 16 can be brought into a number of positions with respect to the direction of movement of the device. This adjustment can be achieved by means of the adjustability of the shaft 18 in the slot 19 of the plate 20. After the adjustment the tension in the feeder belt can be restored by means of the adjustment of the support 22 with respect to the support 8 by means of the bolts 23 which are adjustable in the slot 24. With this construction the active portion of the endless feeder 16 can be brought in a number of positions with respect to the direction of movement of the device in a simple way and thus the best guidance for the tops to be cut towards the rotating disc-shaped cutter 12 can be obtained. After disconnecting the device from the tractor, the device can be supported by means of the supports 65 and 66 described above.

Having thus described my invention, what I claim as new and desire to secure by letters patent of the United States is:

1. A transportable device for topping growing plants comprising a frame extending transversely of the intended direction of travel and at least one topping mechanism supported on said frame, said mechanism comprising a movable cutter and an endless feeder for moving tops to be cut toward said cutter, said feeder being adjustably mounted on said frame, whereby, the operative position of said feeder can be changed in a transverse direction with respect to the intended direction of travel of said device, said frame comprising a laterally extending frame portion and a further frame portion which can be coupled to the three-point lifting device of a tractor, supports on said frame being provided, at least on said laterally extending frame portion, for supporting said device after disconnection from the tractor.

2. A transportable device for topping growing plants comprising a frame extending generally laterally of the intended direction of travel and at least one topping mechanism supported on said frame, said mechanism comprising a driven cutter and a feeder for moving tops to be cut towards said cutter, said feeder comprising an endless member mounted on pulley means to move a forward active portion of said endless member in an oblique path relative to the intended direction of travel and generally rearwardly and toward said cutter, said pulley means comprising spaced apart guide rollers including a forward roller and a rearmost roller, at least one of which is movable relative to the other roller, whereby the position of the forward active portion of said feeder can be varied relative to the direction of intended travel and said cutter.

3. A device as claimed in claim 2, wherein the rearmost roller is adjustable relative to the foremost roller and the foremost roller is drivenly connected to a motor mounted on said frame.

4. A device as claimed in claim 2, wherein said guide rollers are rotatable about vertical axes.

5. A device as claimed in claim 3, wherein said guide rollers are each mounted on substantially vertical shafts, the shaft of said rearmost roller being adjustable along a slot in said frame and said slot extending concentrically relative to the shaft of said foremost roller.

6. A device as claimed in claim 3, wherein the foremost roller is mounted on a driving shaft which also is connected to a drive pulley, said cutter being rotatable about a further shaft which is in driving connection with said drive pulley.

7. A device as claimed in claim 3, wherein the rearmost roller is adjustable in both a rearward and a sideward direction on said frame.

8. A second and device as claimed in claim 5, wherein for a rearward or forward adjustment of said rearmost roller, a substantially straight slot in said frame is provided.

9. A device as claimed in claim 2, wherein guide members are supported on said frame adjacent each side of said cutter, said guide members including screens which depend from said frame to terminate below said cutter.

10. A device as claimed in claim 9, wherein tine means are secured to said frame to extend from a forward location obliquely to the rear generally in the same direction as said feeder.

11. A device as claimed in claim 10, wherein said tine means includes horizontally spaced apart tines which have free ends that terminate above said cutter.

12. A device as claimed in claim 2, wherein there are a plurality of topping devices which are movable along said frame, laterally with respect to the direction of travel.

* * * * *